United States Patent [19]
Cox et al.
[11] 3,794,766
[45] Feb. 26, 1974

[54] DELAY EQUALIZING CIRCUIT FOR AN AUDIO SYSTEM USING MULTIPLE MICROPHONES

[75] Inventors: Donald Clyde Cox, New Shrewsbury; Douglas Otto John Reudink, Colts Neck, both of N.J.

[73] Assignee: Bell Telephone Laboratories, Incorporated, Berkeley Heights, N.J.

[22] Filed: Feb. 8, 1973

[21] Appl. No.: 330,701

[52] U.S. Cl. .............................. 179/1 P, 179/1 HF
[51] Int. Cl. .............................. H04b 15/00
[58] Field of Search... 179/1 HF, 1 P; 325/473, 474, 325/303, 476, 475; 328/115–117

[56] References Cited

UNITED STATES PATENTS

| | | | |
|---|---|---|---|
| 3,057,960 | 10/1962 | Kaiser | 179/1 P |
| 3,644,674 | 2/1972 | Mitchell | 179/1 P |
| 3,403,224 | 9/1968 | Schroeder | 179/1 P |
| 3,700,812 | 10/1972 | Springett | 179/1 P |

*Primary Examiner*—Kathleen H. Claffy
*Assistant Examiner*—Jon Bradford Leaheey
*Attorney, Agent, or Firm*—W. L. Wisner

[57] ABSTRACT

For an audio system such as a telephone station set of the so-called "hands free" variety, the well-known echo effect known as the "rain barrel" effect is reduced and the average signal to echo power ratio is improved by employing a multiplicity of microphones and equalizing the total delays in the signal paths including the microphones at which the strongest audio signals are received. The needed variation of delay is determined by time domain correlation techniques in which one branch circuit includes a relatively fast local peak detector for a product signal and another branch circuit includes a relatively slow absolute peak detector for such a product signal. Other microphones may be similarly paired for delay equalization. The signals are then summed to produce the output signal.

3 Claims, 2 Drawing Figures

DELAY EQUALIZING CIRCUIT FOR AN AUDIO SYSTEM USING MULTIPLE MICROPHONES

BACKGROUND OF THE INVENTION

This invention relates to the reduction of echo effects in audio systems such as those employed in "hands free" telephony.

For an audio system such as the telephone station set known as the speakerphone or "hands free" telephone, it is well known that location of the station set in a room subject to echo effects will produce accentuated echo effects in the transmitted signal. This accentuated echo effect is commonly known as the "rain barrel" effect and is basically due to properties of an audio system designed to receive a speaker's voice from any of an arbitrary plurality of directions. This problem should also be naturally characteristic of any other audio system in which the expected receipt of the desired audio signal can not be predicted as to direction.

The various techniques that are available for reducing the echo effect all reduce the desired advantages of the "hands free" nature of the system. In other words, all such solutions characteristically tend to compel the human speaker or other source to remain nearly stationary or in a predictable region. For example in U.S. Pat. No. 3,644,674 (O. M. M. Mitchell et al), issued Feb. 22, 1972, one possible solution for the "rain barrel" effect is devised in which a plurality of microphones are employed and the output signal is selected as that one of of the signals of the microphones which is intermediate in strength. The theory of this technique is that reflection of sound off the walls produces the strongest signals at one of the microphones by constructive interference with the direct signal and produces the weakest signal at another of the weaker microphones by destructive interference with the direct signal. The operation of that system is adequate only when the speaker tends to keep his head centered with respect to the plurality of microphones. Since his motion is limited, the "hands free" characteristic of the station set or audio system is substantially reduced for him.

Other techniques of overcoming such echo effects have used what is commonly known as frequency domain techniques which are only marginally feasible for mass-production-type systems.

SUMMARY OF THE INVENTION

According to our invention, the advantage of a "hands free" audio system or telephone station set are retained, the echo effect is reduced and the average signal to echo power ratio is improved by employing a multiplicity of microphones, then equalizing the total delay in the audio and electrical signal paths including each of the microphones and summing the signals which have been provided with equal total delays. In a preferred embodiment of our invention, the strongest audio signals are selected for such delay equalization; and, even if all signals are then summed, the effect of the strongest audio signals with equalized delay is predominant in the net output signal. The duplicates of the desired information signal, in other words, add constructively to a much greater extent than do the echo components.

It is characteristic of our invention that the needed variation of delay is determined by time domain correlation techniques which basically seek a condition of peak magnitude of an integrated product signal. In order to ensure that the signals are then properly synchronized and, moreover, substantially matched timewise before summation, not only is the local correlation peak detected on a relatively fast basis but the absolute correlation peak is detected on a slower basis which can then override the fast responses.

According to a subsidiary feature of our invention, other microphones may be similarly paired for delay equalization; and then the signals of equalized total delay are summed to produce the output signal.

BRIEF DESCRIPTION OF THE DRAWING

Further features and advantages of our invention will become apparent from the following detailed description taken together with the drawings in which.

DESCRIPTION OF THE ILLUSTRATIVE EMBODIMENT

Figures 1, 2:
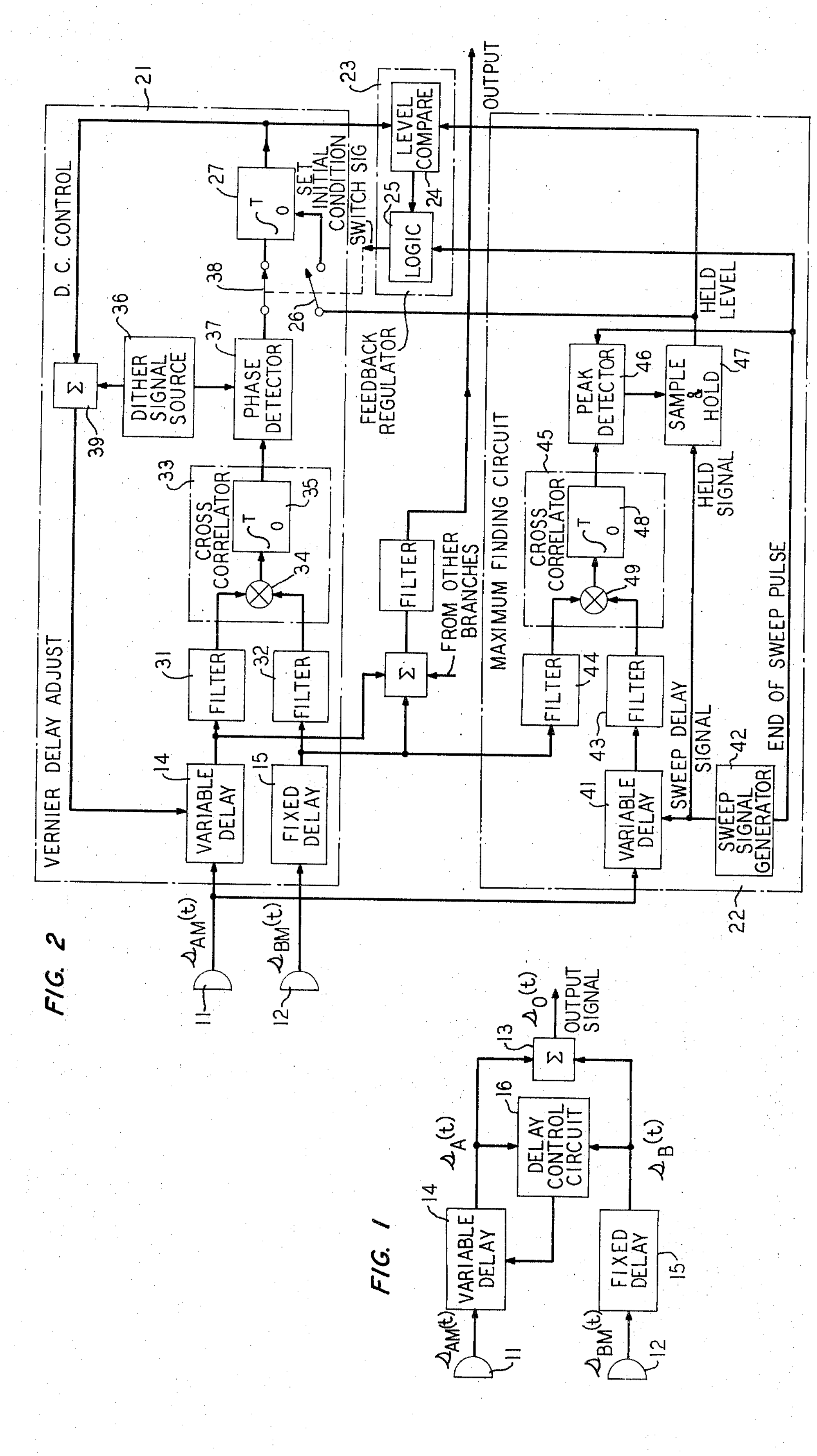
FIG. 1 is a basic block diagrammatic illustration of our invention.
FIG. 2 is a more detailed block diagrammatic illustration of a preferred embodiment of our invention.

In the basic block diagrammatic illustration of FIG. 1 the novel concept is illustrated by the use of two microphones 11 and 12 of the audio system with respect to which the sound source and the echo-producing structures are arbitrarily located with respect to direction. Even the direct audio signals will have different time delays from human speaker to microphones 11 and 12 if the speaker is off center with respect to the two microphones. It should be clear that further differences in time delay exist for signals reflected from walls and received by either of microphones 11 and 12. The strongest one of the direct signal and the reflected signal at one microphone is the desired information signal; and the other is the echo.

Our basic approach employs the technique of achieving equal time delay in the total audio and electric signal path for the desired information signals passing through microphones 11 and 12 before those signals are summed by summing circuit 13 to produce the output signal.

Since the basic audio delays which are concerned are unequal, the total delays are equalized by adjusting the relative electrical delays presented to the signals. To this end, the variable delay 14 processes the signal from microphone 11 while a fixed delay is provided for the signal from microphone 12. The delay control circuit 16 processes the signals at the outputs of delay 14 and 15 according to time domain correlation techniques and varies the variable delay 14 until the detected signals are properly matched in time. These correlated controlled signals are then added by summing circuit 13. That this technique will work can be shown by the following mathematical demonstration.

Assume that $a_1 > a_i$ and $b_1 > b_j$; for all $i, j \neq 1$. Let us represent the output signal from the sound source or human speaker as $s(t)$. Then $$s_{AM}(t) = a_1 s(t - T_{A1}) + \sum_{i=2}^{N} a_i s(t - T_{Ai}) \qquad (1)$$

and $$s_B(t) = b_1 s(t - T_{B1}) + \sum_{j=2}^{M} b_j s(t - T_{Bj}) \qquad (2)$$

where $s_{AM}(t)$ is the signal before the variable delay $T_d$ and the terms in the summations represent the N echoes to 11 and the M echoes to 12. Assume that the variable delay, $T_d$, is adjusted such that $T_d = T_{B1} - T_{A1}$ then $$s_A(t) = a_1 s(t - T_{B1}) + \sum_{i=2}^{N} a_i s(t - T_{Ai} - T_d) \quad (3)$$

and $$s_o(t) = (a_1 + b_1) s(t - T_{B1}) + \sum_{i=2}^{N} a_i s(t - T_{Ai} - T_d) + \sum_{j=2}^{M} b_j s(t - T_{Bj}). \quad (4)$$

For more than two microphones the result would be similarly:

$$s_o(t) = (a_1, + b_1, + c_1, + \ldots) s(t - T_{B1}) + \sum_{i=2}^{N} a_i s(t - T_{Ai} - T_d) + \sum_{j=2}^{M} b_j s(t - T_{Bi}) + \sum_{K=2}^{P} c_i s(t - T_{Ci} - T_d) + \ldots \quad (5)$$

Note that according to our original arbitrary assumption, the strongest signal components which are those associated with the subscript 1 add coherently in that their amplitudes add directly, while the echoes add randomly. Specifically, with many paths and/or many microphones, the echo contributions add in power but not directly in amplitude. Thus, for two microphones, the strongest components are 6 *db* stronger than the average signal into one microphone, if $a_1 = b_1$ for example; while the overall echo power is only 3 *db* stronger than the average echo into one microphone. Thus, for this condition, there is a net signal to echo power ratio increase of about 3 *db* because of the technique of the invention. For *n* microphones the net improvement in signal to echo power would be $10 \log_{10} n$.

With the concept thus verified, the control circuitry may be implemented with time domain correlation techniques as shown in FIG. 2.

In the embodiment of FIG. 2 the variable delay and fixed delay of circuits 14 and 15 are included in a vernier delay adjust circuit 21 which is part of the delay control circuit corresponding to circuit 16 represented in FIG. 1. In the specific embodiment of FIG. 2, the delay control circuit also includes the relatively slow maximum finding circuit 22 which instead of having a direct input from the output of variable delay 14 has one of its inputs from microphone 11 while the other input comes from the output of the fixed delay as shown in FIG. 1. The maximum finding circuit 22 then acts back on the vernier delay adjusting circuit which is the local peak detection circuit through a feedback circuit 23 which can reset the initial conditions of the vernier adjust circuit 21 on a switching basis to make it seek a different local peak until the feedback regulator 23 obtains like inputs to the level comparator 24 thereof. The feedback regulator action on vernier adjusting circuit 21 occurs by the application of a switching signal from the output of logic circuit 25 through the switch 26 to set the initial condition of low-pass integrating filter circuit 27 in vernier adjusting circuit 21.

In more detail, the vernier delay adjust circuit 21 includes the filters 31 and 32 which determine the bandwidth of the signals applied to the cross correlator 33. Their outputs are connected to the inputs of cross correlator 33, which includes the multiplying circuit 34 of known type and the low-pass integrating filter 35. While circuits 34 and 35 are of known type and the cross correlator 33 is of known type, we prefer an analog multiplier of the type disclosed in the book by J. G. Graeme et al, Operational Amplifiers - Design and Applications, McGraw Hill (1971). Typically, multiplier circuit 34 is commerically available as an integrated circuit. The output of cross correlator 33 and the output of a single frequency dither signal source 36 are applied to phase detector 37. The output of the phase detector 37 is then supplied through switching element 38 which is controlled synchronously with switch 26 to the signal input of the low-pass integrating filter 27 to which switch 26 supplies the initial condition. The output of filter 27 and the signal from dither signal force 36 are applied to delay circuit 39 which adjusts the variable delay 14. The circuit just described is a local peak tracking circuit for the product signal from multiplier 34, as will be described more fully hereinafter.

Let us now examine how the initial condition of low-pass integrating circuit 27 is set and reset to ensure that the setting of variable delay 14 is that which gives the maximum product signal from multiplier 34. The maximum finding circuit 22 includes a variable delay circuit 41 similar to variable delay circuit 14 to which the signal from microphone 11 is applied while the delay is adjusted by a sweep delay signal from sweep signal generator 42. It should be noted that the sweep frequency rate of circuit 42 is typically between one and ten cycles per second while the dither frequency rate of dither circuit 36 in circuit 21 can range up to 100 Hz. The output of delay circuit 41 is applied to the input of filter 43 while the output of fixed delay circuit 15 of the vernier adjusting circuit 21 is applied to the filter circuit 44. Now a somewhat similar cross correlation circuit is implemented with cross correlator 45. In other words, circuit 45 may be essentially identical to cross correlation circuit 33; but absolute peak detection for the product signal is provided by applying the output signal of cross correlator 45 to the input of the peak detector 46, the peak detector output is reset to zero by an end of sweep pulse produced by sweep generator 42. The output of peak detector 46 is connected to the input of sample and hold circuit 47, which adjusts to and holds for a pre-selected period the last largest signal from circuit 46. By operating at a slower rate and holding the last found maximum for the desired period of time, say one second, circuit 47 can find the absolute peak for the product signal for most signals of interest. A second input of the sample and hold circuit 47 is provided from the sweep signal generator 42 to provide that type of maximum finding. The output of sample and hold circuit is applied to one input of the level comparator in feedback regulator 23 while the output of low-pass integrating filter 27 is supplied to the other level of comparator 24. The output of the level comparator 24 is applied to one input of logic circuit 25 while the sweep signal from signal generator 42 as a sort of synchronizing signal is applied to the other input of logic circuit 25. Thus, the level comparison only affects the logic circuit 25 at those times at which it is permitted to affect it according to the signal provided by sweep generator 22. If at those times maximum finding circuit 22 does not correspond to the local peak found by circuit 21 the logic circuit 25 opens and recloses switches 26 and 28 to reset the initial conditions of filter 27. Upon the reclosing of switch 26 the output of sample and hold circuit 47 which is the last found maximum is supplied to circuit 27 and correspondingly resets its stored control signal value, subject, of course, to the further changes produced by signals from the output phase detector 37 as applied through switch 38.

In operation the circuitry just described achieves the desired result as more specifically described below.

Consider first the operation of the circuitry enclosed in the dashed line box marked vernier delay adjust. The variable delay device has a delay adjustment range on the order of ± the fixed delay. The fixed delay should be sufficient to cover the maximum delay differences expected between signals from the microphones A and B (and others if more than two branches). The delay through the variable delay device is determined by a slowly changing (d.c.-like) control voltage (or current) and is dithered a small amount by a superimposed dither voltage (or current). The dither frequency must be sufficiently below the low frequency part of the microphone baseband signals so that time averaging in the correlator integrator can be done over several correlation intervals of the baseband signal. (The dither frequency usually will be in the range of 1 to 100 Hz.). Optional filtering of the baseband signal before application to the cross-correlator may be desirable in some cases to permit an increased dither frequency. Outputs from the fixed delay and variable delay devices are multipled and integrated to form a time cross-correlation function for the two signals. The cross-correlation function for the two real, broadband signals will, in general, have many maxima and minima corresponding to delays associated with the average delays in the signal paths of each microphone. Other maxima arise from the auto-correlation function of of the non-multipath corrupted speech. The cross-correlation function for the two signals, as a function of delay between these, is in general an irregular function. It is an underdamped, decaying oscillatory waveform with several maxima.

Referring back to the block diagram of FIG. 2, if the slowly changing (d.c.-like) control voltage is such that the average variable delay is set at a value yielding a local maximum (i.e., a peak) of the cross-correlation function, the cross-correlator output will contain only harmonics of the dither signal. If the variable delay control voltage is not set at a maximum of the correlation function, the correlator output will contain a component of the dither signal. The amplitude of this component will be proportional to the offset in delay from the nearest correlation function local maximum. The correlator output and the dither signal are compared in a phase comparator whose output is an error signal proportional to the offset of the correlation function from its nearest local maximum. The polarity of the error is such that when applied to the input of filter 27 it will cause the filter output signal to change such that the variable delay approaches that yielding the nearest local maximum of the cross-correlation function. This output of filter 27 is the slowly changing d.c.-like control voltage applied to the variable delay element 14. Thus, this feedback loop in the vernier delay adjusting circuit 21 acts to keep the variable delay centered on a maximum of the cross-correlation function of the two microphone outputs.

Now consider the operation of the maximum finding circuit of the block diagram. This maximum finder makes use of part of the output from the fixed delay and the output of another variable delay device. This variable delay device is driven by a monatonic sweep generator (waveform is not important) which sweeps the delay device from zero to its maximum delay and then puts out a pulse to indicate end of sweep. The sweep is repetitive and of slow period compared to the dither period of the vernier but fast enough to rapidly catch gross changes in echo characteristics of the two input signals (probably 0.1 to 1 second period). This sweep period must also be long enough so that the delay does not change significantly during the integrating period of the integrator 48 in cross correlator circuit 45. The swept variable delay output and fixed delay output are cross-correlated as previously indicated for correlator 33. The output of this correlator 45 is fed to a peak amplitude detector 46. This peak detector is reset to zero with each end of sweep pulse. The peak detector holds the last maximum value of the output of correlator 45 as the sweep progresses and generates a pulse by conventional circuitry each time a greater maximum value is encountered during the sweep. This pulse triggers the sample and hold circuit 47 that stores the value of the sweep voltage for the last maximum of the correlator output encountered during the sweep. Note that as the variable delay is swept, the output of the cross-correlator is the cross-correlation function. Thus, at the end of the sweep of variable delay 41, and just prior to the reset pulse to peak detector 46, the peak detector holds the overall maximum value of the cross-correlation function and the sample and hold holds the variable delay device control voltage that can produce a delay corresponding to that overall absolute maximum value.

Consider now the control function and the interaction between the vernier delay adjust 21 and the maximum finding circuit 22. The control voltage from integrator 27 and the held control voltage from sample and hold circuit 47 are compared in the level comparator 24. If the values are within a predetermined tolerance of each other, the comparator output into the logic circuit 25 is off. If the values differ by greater than the tolerance, the output of circuit 25 is on. The end of sweep pulse from the sweep source is off until the end of sweep. Then, end of sweep pulse turns the logic circuit 25 on. The logic output is off when either input is off but is on if both inputs are on. When the logic output switches on at the end of a sweep, the output of the integrator 27 in the control loop of the vernier delay adjust is set equal to the voltage held by the sample and hold circuit 47. This sets the delay of the vernier variable delay to the delay value for the cross-correlation function absolute maximum. This integrator output setting can illustratively be done by rapidly charging or discharging an integrating capacitor through a low impedance source which is only connected when the logic output is on, as is well known.

The overall result of the comparison and logic operation is to set the vernier variable delay control voltage to the value corresponding to the delay for the overall maximum of the cross-correlation function. The vernier will track this maximum for small relative delay shifts. The output of the vernier variable delay device and the fixed delay device are then summed to produce the average 3 *db* improvement in signal to echo power for the two microphones since for the cross-correlation function maximum the average delay for the strongest path between speaker and microphone for each branch is equal. The dither signal can be filtered from the output since it is below the baseband frequencies.

It is obvious that additional microphones can be connected similarly by using an additional vernier and maximum finding loop for each additional microphone.

Some applications may not need the vernier delay adjustment since if the delays of the different paths change slowly enough compared to the sweep period of the maximum finding circuit it will be sufficient to set the vernier delay at the end of each maximum finding sweep and hold that delay until the end of the next sweep. In this case, the comparison and control logic, the dither, the phase comparator and cross-correlator and control function in the vernier delay adjustment could be replaced by another sample and hold gate that would be connected to the first sample and hold gate and be triggered to be set to its input value by the end of sweep pulse. The second sample and hold gate output would then be connected to the variable delay device to hold that delay for summation until the end of the next sweep.

The preferred implementation for the components of FIG. 2 is as follows: the variable electrical delay circuits 14 and 41 are integrated circuit devices of the type known as charge coupled devices of the type which process the signal by a "bucket brigade" controlled by a clock. The passage of the signal from one storage element to the next through the device takes a period of time that depends upon the clock rate. The clock rate is set by an oscillator and is varied to vary the delay of circuits 14 and 41 by changing the oscillator frequency. To this end, the oscillator is a voltage-controlled oscillator; and its frequency is changed by changing its voltage. While several voltage-controlled oscillators are known in the art, they typically all involve varying the termination point of a ramp type signal or the pick-off point of a similar function. Further description of voltage-controlled oscillators may be found in the above-cited book by J. G. Graeme.

Further descriptions of charge-coupled analog delay devices may be found in the 1970 IEEE International Solid State Circuits Conference Proceedings, especially that of Session 6 "Semiconductor Memories II" and references cited thereon. Of particular interest is the article therein by F. L. J. Sangster entitled "Integrated MOS and Bipolar Analog Delay Lines Using Bucket Brigade Capacitor Storage" and also reference No. 3 cited thereafter by Sangster et al.

We claim:

1. A circuit for enhancing a desired signal in the presence of an undesired signal comprising first and second channels mutually arranged both to receive a desired signal and to receive an undesired signal with differing delays at the respective inputs of said channels between said desired and undesired signals, at least one of said channels having a controllable variable delay therein, means for causing the desired signal to arrive simultaneously at the outputs of both channels comprising means for correlating the instantaneous signal amplitudes in both channels and means for controlling said variable delay to yield time coincidence of like amplitudes at said outputs, and means for summing the signals at the outputs of said channels.

2. A circuit according to claim 1 in which the correlating means comprises a first branch circuit means for detecting a local maximum of a signal that is a product of the signals in the two channels, including means for dithering the variable delay at a first frequency, a second branch circuit means for detecting the absolute maximum of a signal that is a product of the signals in the two channels, including means for dithering the variable delay at a second frequency substantially less than said first frequency, and means for intermittently resetting the output of the first branch circuit to correspond to the output of the second branch circuit.

3. A circuit according to claim 2 in which the summing means includes means for filtering the first and second frequencies from the ultimate output signal.

* * * * *